US010149465B2

(12) United States Patent
Omura

(10) Patent No.: US 10,149,465 B2
(45) Date of Patent: Dec. 11, 2018

(54) FISHING LINE GUIDE AND METHOD OF MANUFACTURE

(71) Applicant: FUJI KOGYO CO., LTD., Shizuoka-shi (JP)

(72) Inventor: Kazuhito Omura, Shizuoka (JP)

(73) Assignee: FUJI KOGYO CO., LTD., Shizuoka-shi (JP)

( * ) Notice: Subject to any disclaimer, the term of this patent is extended or adjusted under 35 U.S.C. 154(b) by 65 days.

(21) Appl. No.: 15/311,971

(22) PCT Filed: Apr. 28, 2015

(86) PCT No.: PCT/JP2015/062757
§ 371 (c)(1),
(2) Date: Nov. 17, 2016

(87) PCT Pub. No.: WO2015/178174
PCT Pub. Date: Nov. 26, 2015

(65) Prior Publication Data
US 2017/0118967 A1    May 4, 2017

(30) Foreign Application Priority Data

May 23, 2014    (KR) .................. 10-2014-0062138

(51) Int. Cl.
*A01K 87/04* (2006.01)
*B21K 17/00* (2006.01)

(52) U.S. Cl.
CPC ............. *A01K 87/04* (2013.01); *B21K 17/00* (2013.01)

(58) Field of Classification Search
CPC .................. A01K 87/04; B21K 17/00
(Continued)

(56) References Cited

U.S. PATENT DOCUMENTS 1,781,569 A  *  11/1930  Cook ................ A01K 87/04
                                                      43/24
2,713,228 A  *  7/1955  Grunwald ............ A01K 91/06
                                                      43/25
(Continued)

FOREIGN PATENT DOCUMENTS

DE      25 24 795 A1    10/1976
EP       0 760 205 A1    3/1997
(Continued)

OTHER PUBLICATIONS

International Search Report dated Jun. 30, 2015, in PCT/JP2015/062757 filed Apr. 28, 2015.

*Primary Examiner* — Marc Burgess
(74) *Attorney, Agent, or Firm* — Oblon, McClelland, Maier & Neustadt, L.L.P.

(57) ABSTRACT

A fishing line guide including an attachment foot having a thin thickness, a shorter length and a high strength. The fishing line guide includes at least one support leg, an attachment foot located at a distal end of the support leg, and a reinforcement groove formed in the attachment foot. The attachment foot has a lower surface making contact with a portion of a fishing rod, an upper surface located opposite the lower surface in a thickness direction, one end connected to the distal end of the support leg, and an opposite end located opposite the one end in a longitudinal direction. The reinforcement groove extends along the longitudinal direction of the attachment foot from the one end toward the opposite end in the lower surface of the attachment foot. A portion of the support leg and the attachment foot are made of a metallic material.

16 Claims, 14 Drawing Sheets

(58) Field of Classification Search
USPC .................................................. 43/24, 25
See application file for complete search history.

(56) References Cited

U.S. PATENT DOCUMENTS

| | | | | |
|---|---|---|---|---|
| 3,997,997 A * | 12/1976 | Yamamoto | ............ | A01K 87/04 43/24 |
| 4,035,454 A * | 7/1977 | Klein | ................ | A01K 87/04 43/24 |
| 4,141,132 A * | 2/1979 | Ohmura | ................ | A01K 87/04 29/432 |
| 4,176,488 A * | 12/1979 | Ohmura | ................ | A01K 87/04 43/24 |
| 4,428,140 A * | 1/1984 | Yamamoto | ............ | A01K 87/04 43/24 |
| 4,507,891 A * | 4/1985 | Ohmura | ................ | A01K 87/04 43/24 |
| D280,656 S * | 9/1985 | Ohmura | ................ | D22/143 |
| 4,682,439 A * | 7/1987 | Inoue | ................ | A01K 87/04 43/24 |
| 5,361,529 A * | 11/1994 | Lindler | ................ | A01K 87/04 43/24 |
| 5,417,007 A * | 5/1995 | Stotesbury | ............ | A01K 87/04 43/24 |
| 5,870,848 A * | 2/1999 | Ohmura | ................ | A01K 87/04 43/24 |
| 5,901,492 A * | 5/1999 | Ohmura | ................ | A01K 87/04 43/24 |
| 6,378,240 B1 | 4/2002 | Ohmura | | |
| 8,387,302 B2 | 3/2013 | Akiba et al. | | |
| 2006/0032107 A1* | 2/2006 | Yu | ................ | A01K 87/04 43/24 |
| 2006/0283073 A1 | 12/2006 | Omura | | |
| 2008/0005953 A1 | 1/2008 | Anderson | | |
| 2016/0088821 A1 | 3/2016 | Omura | | |

FOREIGN PATENT DOCUMENTS

| | | |
|---|---|---|
| JP | 10-313744 A | 12/1998 |
| JP | 2000-253778 A | 9/2000 |
| JP | 2006-340661 A | 12/2006 |
| JP | 2011-223920 A | 11/2011 |
| JP | 2012-75332 A | 4/2012 |
| JP | 2012-75374 A | 4/2012 |
| KR | 20-0366928 Y1 | 11/2004 |
| KR | 10-2010-0109450 A | 10/2010 |
| KR | 10-1391116 B1 | 4/2014 |

* cited by examiner

FISHING LINE GUIDE AND METHOD OF MANUFACTURE

CROSS-REFERENCE TO RELATED APPLICATIONS

This application is a 35 U.S.C § 371 national stage filing of International Application No. PCT/JP2015/062757, filed on Apr. 28, 2015, which claims the benefit of Korean Patent Application No. 2014-0062138, filed on May 23, 2014, the entire contents of each of which are incorporated by reference herein.

TECHNICAL FIELD

The present disclosure relates to a fishing line guide which is attached to a fishing rod and guides a fishing line, and a method of manufacturing a fishing line guide. Further, the present disclosure relates to a fishing rod including a fishing line guide.

BACKGROUND

A fishing line guide is attached to a fishing rod to guide a fishing line, which is unwound from a reel or is wound around the reel again, along the fishing rod. The fishing line guide has a guide ring, through which a fishing line passes, and a frame which is attached to a fishing rod and supports the guide ring. The frame of the fishing line guide is made of a metallic material or a plastic material.

FIG. 19 shows a fishing line guide of a prior art which includes a metal-made frame. The fishing line guide 20 shown in FIG. 19 has a guide ring 21 through which a fishing line passes, a ring retaining portion 22 retaining the guide ring 21, a support leg 23 extending from the ring retaining portion 22, and an attachment foot 24 which extends from a distal end of the support leg 23 and is attached to a portion 11 of a fishing rod 10. The ring retaining portion 22, the support leg 23 and the attachment foot 24 are integrally formed from a metallic material. The fishing line guide 20 is firmly fixed to the fishing rod 10 by winding a winding thread 12 around the fishing rod portion 11 to cover the attachment foot 24, and applying an adhesive on the wound winding thread 12, and then hardening the adhesive to form an adhesive coating 13.

The fishing line guide 20 transmits a tensional force applied to the fishing line to the fishing rod 10 and distributes the tensional force, while guiding the fishing line. Where the tensional force occurs in the fishing line during landing a fish, or where the fishing line is caught or entangled on the ring retaining portion 22 or the support leg 23 during casting a fishing rig, loads which are caused by the tensional force applied to the fishing line are concentrated on the vicinity of a joint between the support leg 23 and the attachment foot 24 (see the portion indicated by the symbol LC in FIG. 19). If such loads are heavily concentrated, the attachment foot 24 may be damaged or deformed, and the attachment foot 24 may be pulled out from the winding thread 12 and therefore be detached from the portion 11 of the fishing rod 10.

Patent Document 1: Japanese Patent Application Publication No. 2000-253778

SUMMARY

When a fishing rig is cast or a fish is landed, a lightweight fishing rod is advantageous to fishing sensitivity. For reduction in weight of a fishing rod, a lightweight fishing line guide is needed.

To reduce the weight of the fishing line guide having a metal-made frame shown in FIG. 19, one consideration may be to use a thin metal sheet such as the material of the fishing line guide, to decrease the thickness or length of the attachment foot or the like. However, an attachment foot having a thin thickness fails to sufficiently resist the load concentration (see the portion indicated by a symbol LC in FIG. 19) during the landing of a fish, and thus may be damaged or deformed. That is, a metal sheet having a thin thickness to reduce the weight of the fishing line guide cannot provide a sufficient level of strength which the fishing line guide requires. Further, the attachment foot having a shorter length may be pulled out from the winding thread. To have the required strength, a fishing line guide with a plastic-made frame necessarily has a thick support leg and a thick attachment foot. Therefore, there is difficulty in having the winding thread densely wound around the thick attachment foot, decreasing the productivity of a fishing rod. Further, the thick attachment foot increases a step portion between the attachment foot and the fishing rod, thus causing entanglement of the fishing line.

To reduce the weight of the fishing line guide, the thickness of the support leg and attachment foot of the fishing line guide must be thin and the length of the attachment foot must be short, while the required strength must be satisfied. However, the fishing line guide of the prior art does not satisfy all three factors such as the achievement of a reduction in weight, the satisfaction of a required strength, and the prevention of being pulled out from the winding thread.

Embodiments disclosed in the present disclosure solve the aforementioned problems of the prior art. Some embodiments of the present disclosure provide a fishing line guide, which has a required strength and is lightweight. Some embodiments of the present disclosure provide a method of manufacturing the fishing line guide.

Further, some embodiments of the present disclosure provide a fishing rod including the aforementioned fishing line guide.

One aspect of the present disclosure provides a fishing line guide which is attached to a fishing rod and guides a fishing line. An exemplary fishing line guide includes a ring retaining portion retaining a guide ring through which a fishing line passes, at least one support leg extending from the ring retaining portion, an attachment foot located at a distal end of the support leg and attached to a fishing rod, and a reinforcement groove formed in the attachment foot. The attachment foot has a lower surface making contact with a portion of a fishing rod, an upper surface located opposite the lower surface in a thickness direction, one end connected to the distal end of the support leg, and an opposite end located opposite the one end in a longitudinal direction. The reinforcement groove extends in the lower surface of the attachment foot along the longitudinal direction of the attachment foot from the one end toward the opposite end. The reinforcement groove has an open end located at the one end of the attachment foot, and a closed end located opposite the open end and spaced apart from the opposite end of the attachment foot toward the one end of the attachment foot. A portion of the support leg and the attachment foot are made of a metallic material.

In an embodiment, a portion of the attachment foot in the thickness direction between the reinforcement groove and the upper surface of the attachment foot comprises a work-hardened portion. Further, the reinforcement groove is formed by indenting the lower surface of the attachment foot toward the upper surface of the attachment foot.

In an embodiment, a depth of the reinforcement groove is 20% to 80% of a thickness between the lower surface and the upper surface of the attachment foot. Further, a length of the reinforcement groove is 10% to 90% of a length between the one end and the opposite end. Further, a width of the reinforcement groove is 20% to 80% of a maximum width of the attachment foot.

In an embodiment, the fishing line guide further includes a support leg reinforcement groove which is formed in a surface of the support leg and extends from the reinforcement groove.

A further aspect of the present disclosure relates to a method of manufacturing a fishing line guide. Exemplarily, there is provided a method of manufacturing a fishing line guide, which includes at least one support leg and an attachment foot, from a metallic blank sheet. According to an exemplary method of manufacturing a fishing line guide, a reinforcement groove is formed in a lower surface of the attachment foot which makes contact with a portion of a fishing rod. The reinforcement groove is formed so as to extend in a longitudinal direction of the attachment foot from one end of the attachment foot toward an opposite end oppositely located in the longitudinal direction of the attachment foot, by indenting a lower surface of the attachment foot, which makes contact with a portion of a fishing rod, toward an upper surface located opposite the lower surface in a thickness direction of the attachment foot. Further, the support leg, which is connected to the one end of the attachment foot at a distal end and is bent with respect to the attachment foot, is formed.

According to another exemplary method of manufacturing a fishing line guide, at least one support leg and an attachment foot, which is connected to a distal end of the support leg at one end and is bent with respect to the support leg, are formed by pressing a metallic sheet, and a reinforcement groove is formed in the attachment foot. The reinforcement groove is formed in a lower surface of the attachment foot, which makes contact with a portion of a fishing rod, so as to extend in a longitudinal direction of the attachment foot from the one end of the attachment foot toward an opposite end oppositely located in the longitudinal direction of the attachment foot. The reinforcement groove is formed by indenting the lower surface of the attachment foot toward the upper surface located opposite the lower surface in the thickness direction of the attachment foot.

Another aspect of the present disclosure provides a fishing rod including the aforementioned fishing line guide or the fishing line guide manufactured by the aforementioned method of manufacturing a fishing line guide.

The aforementioned fishing line guide has the reinforcement groove in a portion of the attachment foot on which loads are concentrated. The load-concentrated portion of the attachment foot is work-hardened by the reinforcement groove, and therefore the attachment groove is strong against plastic deformation. Thus, the fishing line guide includes the attachment foot with increased strength. Since the strength of the attachment foot is increased due to the reinforcement groove, the attachment foot of the fishing line guide can be manufactured from a thinner metal sheet, thus achieving a lightweight fishing ling guide having high strength. The attachment foot, the strength of which is increased due to the reinforcement groove, can be designed to have a thinner thickness. Since a winding thread can be easily wound around such a thin attachment foot, the productivity of a fishing rod can be increased, and the entanglement of a fishing line does not occur due to a small step portion between the attachment foot and an outer circumferential surface of a fishing rod.

Further, an adhesive, which flows into the reinforcement groove of the attachment foot and is then hardened, functions as an anchor fixing the attachment foot to the fishing rod. Thus, the fishing line guide is prevented from being separated from a winding thread due to the load which is applied by a fishing line when the fishing line is pulled by a fishing rig under the state where the fishing line is entangled on the fishing line guide during casting of the fishing rig. Therefore, the attachment foot of the fishing line guide can be set to be shorter than the attachment foot of the prior art. The attachment foot, which is set to be short, can achieve the reduction in weight of the fishing line guide, and improve the performance of the fishing rod without hindering the fishing rod from being bent.

DETAILED DESCRIPTION

Figure 1:
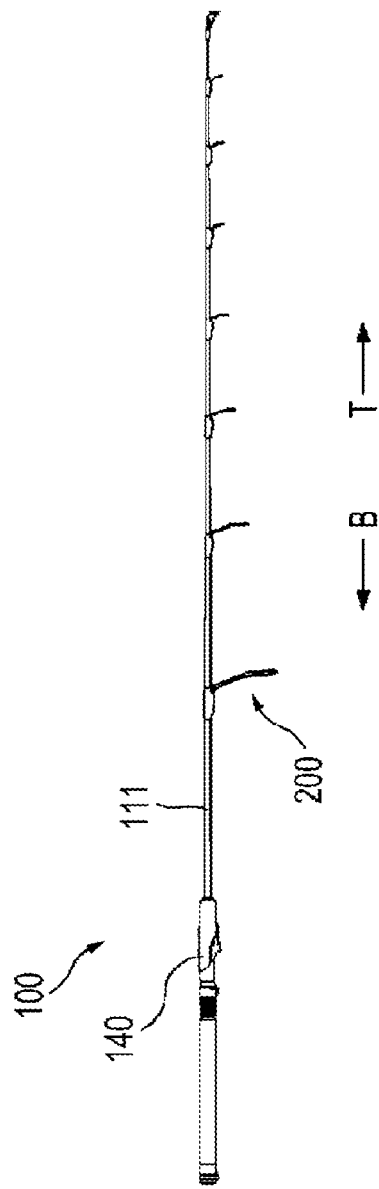
FIG. 1 is a side view showing a fishing rod according to one embodiment which includes a fishing line guide according to one embodiment.

Descriptions are made as to embodiments of a fishing line guide and a manufacturing method thereof, and embodiments of a fishing rod including the fishing line guide with reference to the accompanying drawings. In the drawings, like reference numerals denote like or corresponding elements or parts.

The directional term 'frontward,' 'front' or the like as used herein means a direction directed toward a tip of a fishing rod, while the directional term 'rearward,' 'rear' or the like means a direction directed toward a butt of a fishing rod. Further, as used herein, the directional term 'upward,' 'upper' or the like is based on a direction in which a ring retaining portion, to which a guide ring is fitted, is positioned with respect to an attachment foot, while the directional term 'downward,' 'lower' or the like means a direction opposite to the upward or upper direction.

A fishing rod according to one embodiment is described with reference to FIGS. 1 and 2. In FIG. 1, an arrow T indicates a tip of a fishing rod, while an arrow B indicates a butt of a fishing rod.

A fishing rod 100 according to one embodiment has a thin and elongated rod body which has a cylindrical shape. A rod body of the fishing rod consists of a single rod or a plurality of partial rods. If the rod body consists of a plurality of partial rods, the partial rods are connected in a put in type, a put over type, a telescopic type or the like. The fishing rod 100 has a reel seat 140 for attachment of a reel (not shown) in the vicinity of the butt of the fishing rod. Further, the fishing rod 100 includes at least one fishing line guide 200 according to one embodiment, which is attached to a portion 111 of the rod body and guides a fishing line. Hereinafter, said portion of the rod body of the fishing rod is briefly referred to as the fishing rod portion 111. If the rod body consists of a single rod, the fishing rod portion includes a portion of said single rod in a longitudinal direction. If the rod body consists of a plurality of partial rods, the fishing rod portion includes any one of the partial rods.

Figure 2:
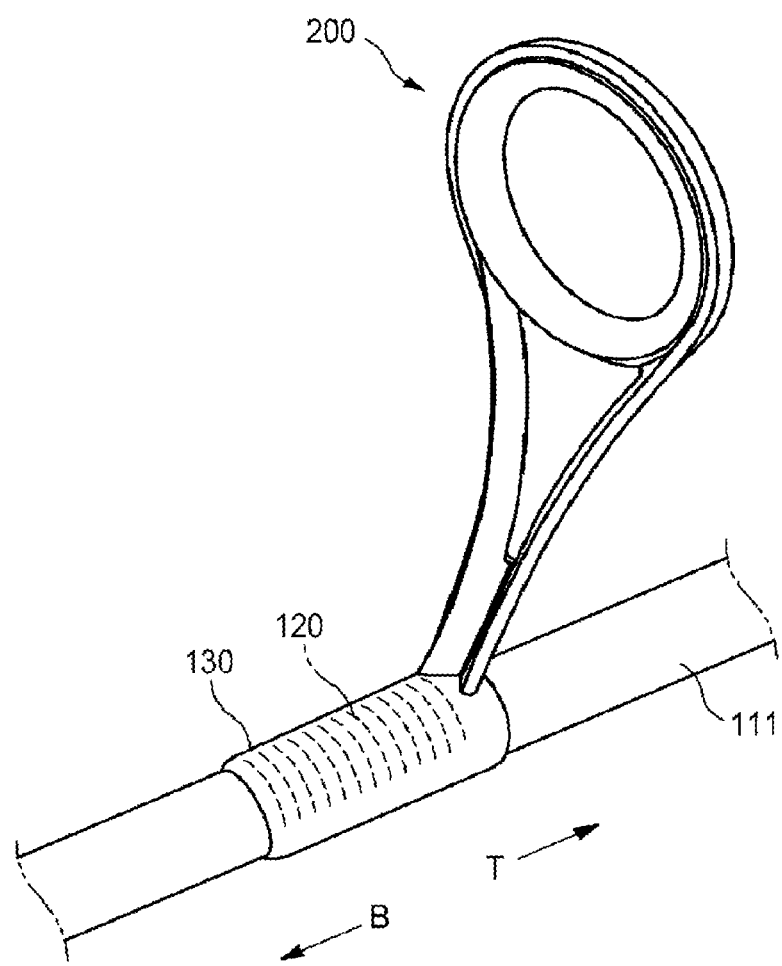
FIG. 2 is a perspective view showing a portion of the fishing rod shown in FIG. 1.

Referring to FIG. 2, the fishing line guide 200 according to one embodiment is attached to the fishing rod 100 by bringing its attachment portion into contact with the outer circumferential surface of the fishing rod portion 111 and then densely winding a winding thread 120 around the fishing rod portion 111 at which the attachment portion is positioned. After the winding thread 120 is wound, to prevent unwinding of the winding thread 110 and to fill in gaps, an adhesive is applied on the winding thread and the attachment portion to an extent greater than the wound winding thread 120, and is then hardened. If the adhesive is hardened, then an adhesive coating 130 is formed throughout the entire wound winding thread 120 and the attachment portion. Thus, the fishing line guide 200 is firmly fixed to the fishing rod 100.

Fishing line guides according to embodiments are described with reference to FIGS. 3 to 18. The fishing line guides according to these embodiments include a ring retaining portion retaining a guide ring through which a fishing line passes, at least one support leg extending from the ring retaining portion, and an attachment foot which is located at a distal end of the support leg and is attached to the fishing rod portion. Further, the fishing line guides according to embodiments have, at the attachment foot, a reinforcement groove for enhancing the strength of the attachment foot. The fishing ling guide according to one embodiment includes a single attachment foot. The fishing line guide, which includes a single attachment foot, may include a single support leg connected to the attachment foot or a pair of support legs connected to the attachment foot. The fishing line guide according to another embodiment includes two attachment feet which are spaced apart in a longitudinal direction of the fishing rod. The fishing line guide, which includes two attachment feet, may include a single support leg connected to one of the attachment feet or a pair of support legs connected to one of the attachment feet.

FIGS. 3 to 13 show the fishing line guide 200 according to one embodiment. The fishing line guide 200 shown in FIGS. 3 to 13 has a single attachment foot. Such a fishing line guide is referred to as a single-foot fishing line guide in the art.

Referring to FIGS. 3 to 13, the fishing line guide 200 according to one embodiment includes a guide ring 210 through which a fishing line passes, a ring retaining portion 220 retaining the guide ring 210, a support leg 230 extending from the ring retaining portion 220, and an attachment foot 240 located at a distal end of the support leg 230 and attached to the fishing rod portion 111. Each part of the fishing line guide 200, except the guide ring 210, is formed from a metallic sheet.

In this embodiment, the guide ring 210 is circular and has a circular opening, through which the fishing line passes, therein. The guide ring 210 is made of a hard material such as ceramic, and makes contact with the fishing line on its surface. The ring retaining portion 220 has a ring shape with a circular opening such that the ring retaining portion 220 retains the guide ring 210 throughout the outer circumferential surface of the guide ring. The guide ring 210 is fitted to an inner peripheral surface of the ring retaining portion 220 at the outer circumferential surface of the guide ring.

The support leg 230 extends from the ring retaining portion 220 and supports the guide ring 210 and the ring retaining portion 220 with respect to the fishing rod 100. In this embodiment, the support leg 230 extends from a lower end of the ring retaining portion 220, and is inclined from the ring retaining portion 220 toward the butt of the fishing rod 100 (in the direction of the arrow B shown in FIG. 2). Further, in this embodiment, the support leg 230 includes a left half 230L and a right half 230R which are symmetrical with respect to a vertical line passing through a center of the guide ring 210. The left half 230L and the right half 230R are acutely bent in the shape of a circular arc. Upper portions of the left and right halves are spaced apart via an inverted triangular opening 231, and lower portions of the left and right halves are integrally formed. Further, the lower portion of the support leg 230 is angularly bent in a width direction thereof. When a cross section is taken at the lower portions of the left half 230L and the right half 230R, the support leg 230 has a V-like cross sectional shape.

Figure 3:
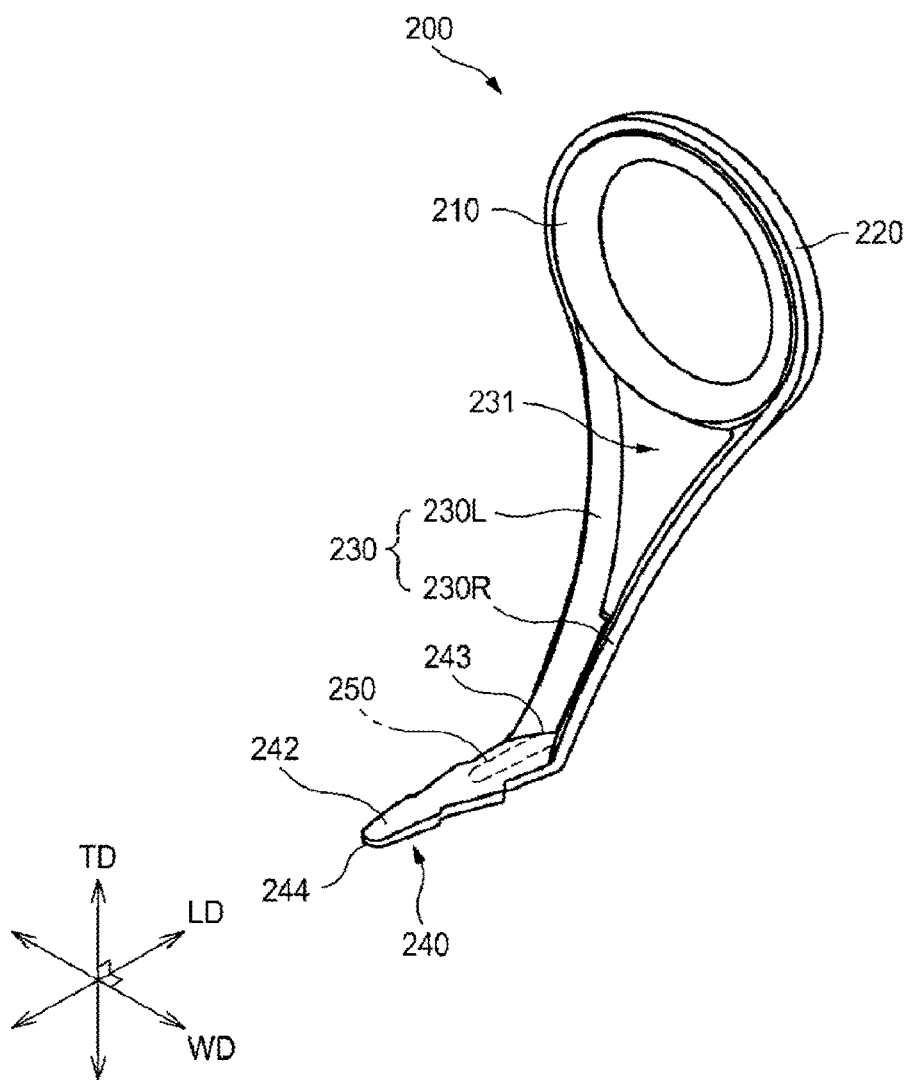
FIG. 3 is a perspective view showing a fishing line guide according to one embodiment.
Figure 4:
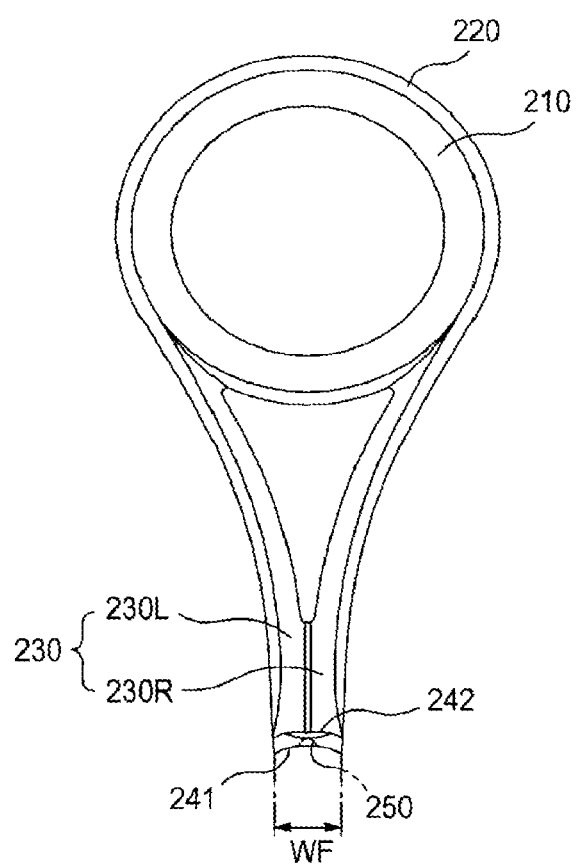
FIG. 4 is a front view of the fishing line guide shown in FIG. 3.
Figure 5:
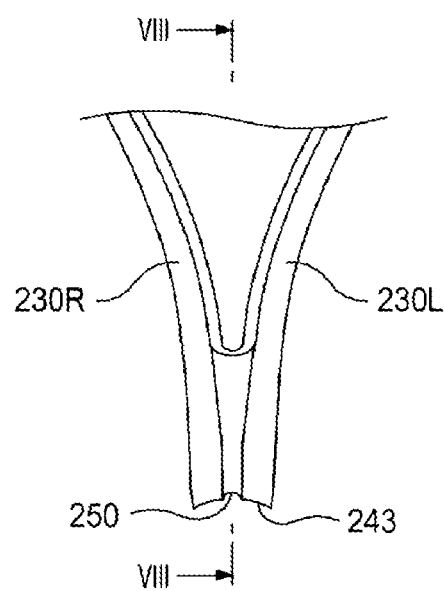
FIG. 5 is a rear view of the fishing line guide shown in FIG. 3, showing only a support leg.
Figure 6:
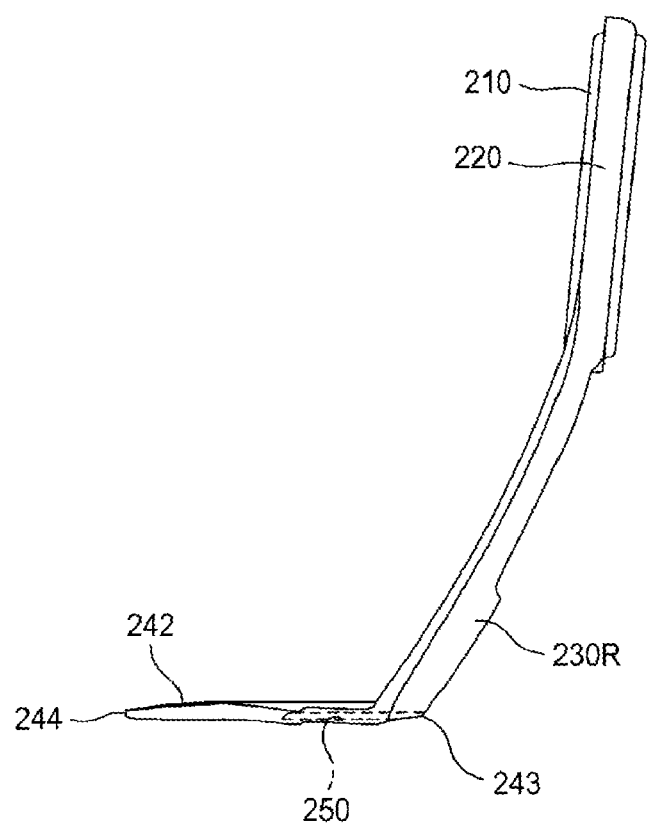
FIG. 6 is a side view of the fishing line guide shown in FIG. 3.
Figure 7:
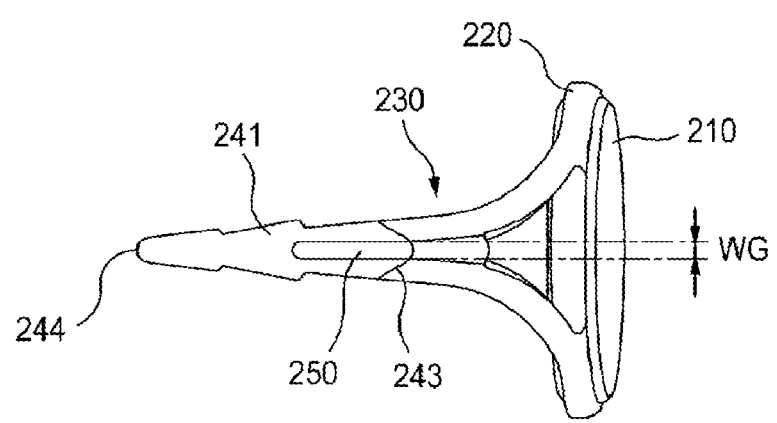
FIG. 7 is a bottom view of the fishing line guide shown in FIG. 3.

The fishing line guide 200 includes the attachment foot 240 for attachment to the fishing rod portion 111 at the distal end of the support leg 230. The attachment foot 240 has a thin and flat shape. When the fishing line guide 200 is viewed from the side, the attachment foot 240 has a lower surface 241 which makes contact with the outer circumferential surface of the fishing rod portion 111, and an upper surface 242 which is located opposite the lower surface 241 in a thickness direction of the attachment foot 240 (e.g., in a direction of an arrow TD shown in FIG. 3). In this embodiment, the lower surface 241 includes a curved surface which extends in a longitudinal direction of the attachment foot 240 (i.e., in the direction of an arrow TD which is shown in FIG. 3 and corresponds to the longitudinal direction of the fishing rod portion 111) and is upwardly concave with a little curvature. Further, when the fishing line guide 200 is viewed from the top, the attachment foot 240 has one end 243 and an opposite end 244 which is located opposite the one end 243 in the longitudinal direction of the attachment foot 240. The attachment foot 240 is integrally formed with the distal end of the support leg 230 at the one end 243, and extends from the distal end of the support leg 230. In this embodiment, the attachment foot 240 and the support leg 230 are bent at an obtuse angle with respect to each other. The attachment foot 240 has serrated side edges.

The fishing line guide 200 includes a reinforcement groove 250 for strength reinforcement. The reinforcement groove 250 is formed in the lower surface 241 of the attachment foot 240. The reinforcement groove 250 is centrally located in the lower surface 241 in a width direction of the attachment foot 240 (e.g., in a direction of an arrow WD shown in FIG. 3). The reinforcement groove 250 extends along the longitudinal direction of the attachment foot 240 from the one end 243 of the attachment foot 240 toward the opposite end 244 of the attachment foot 240. Thus, the reinforcement groove 250 has an open end 251 which is located at the one end 243 of the attachment foot 240, and a closed end 252 which is located opposite the open end 251.

Figure 8:
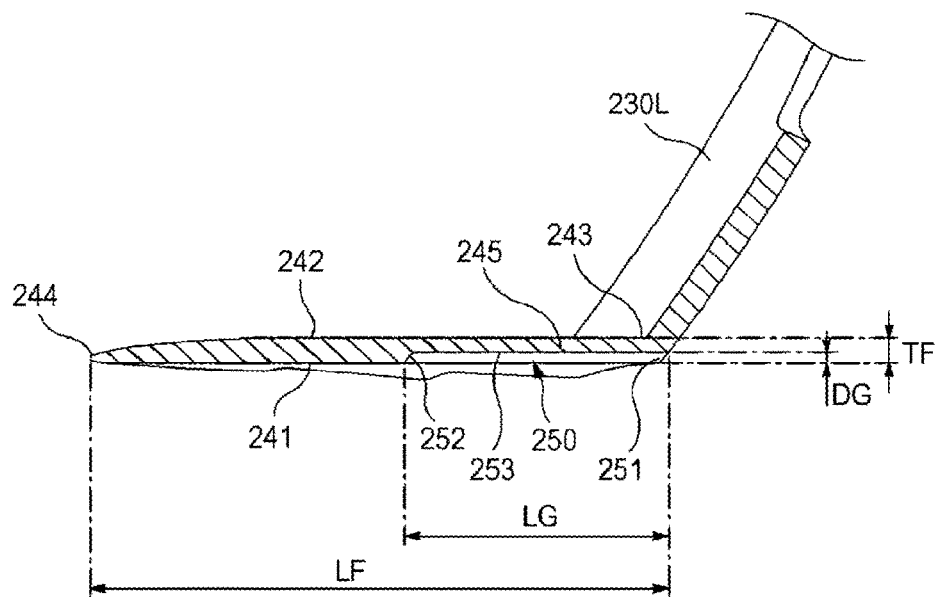
FIG. 8 is a sectional view taken along the line VIII-VIII of FIG. 5.

The reinforcement groove 250 is formed by indenting the lower surface 241 of the attachment foot 240 toward the upper surface 242 in the shape of the reinforcement groove 250. Indenting of the indenting operation is performed until the metallic material constituting the attachment foot 240 is work-hardened. Thus, as shown in FIG. 8, a portion of the attachment foot 240, which is between a bottom 253 of the reinforcement groove 250 and the upper surface 242 of the attachment foot 240 in the thickness direction of the attachment foot 240, at least partially or wholly includes a work-hardened portion 245 which is work-hardened through the indenting operation. The work-hardened portion 245 has a yield stress or proof stress greater than other portions of the attachment foot 240. The work-hardened portion 245 may be formed along the reinforcement groove 250 from the one end 243 of the attachment foot 240 up to the closed end 252 of the reinforcement groove 250. If the attachment foot 240 is in contact with the outer circumferential surface of the fishing rod portion 111 at the lower surface 241, then the reinforcement groove 250 formed by the aforementioned indenting operation makes a space between the reinforcement groove 250 and the outer circumferential surface of the fishing rod portion 111. Further, since the open end 251 of the reinforcement groove 250 is located at the one end 243 of the attachment foot 240, the adhesive for firmly fixing the fishing line guide 200 can flow to the inside of the reinforcement groove 250 through the open end 251 of the reinforcement groove 250. The adhesive flowing into the reinforcement groove 250 is hardened, and then creates an anchor portion of the adhesive coating 130 which firmly fixes the fishing line guide 200 to the fishing rod portion 111. The anchor portion of the adhesive coating is described below.

In one embodiment, the reinforcement groove 250 has a depth DG of 20% to 80% of a thickness TF of the attachment foot 240 between the lower surface 241 and the upper surface 242. Further, the reinforcement groove 250 has a length LG of 10% to 90% of a length LF between the one end 243 and the opposite end 244 of the attachment foot 240 (i.e., the overall length of the attachment foot 240). Thus, the closed end 252 of the reinforcement groove 250 is spaced apart from the opposite end 244 of the attachment foot 240 toward the one end 243 of the attachment foot, and a distance between the opposite end 244 of the attachment foot 240 and the closed end 252 of the reinforcement groove 250 becomes 10% to 90% of the length between the one end 243 and the opposite end 244 of the attachment foot 240. Further, the reinforcement groove 250 has a width WG of 20% to 80% of a maximum width WF of the attachment foot 240. The lower surface 241 of the attachment foot 240 may be acutely bent with a curvature corresponding to the curvature of the outer circumferential surface of the fishing rod portion 111. By way of an example of a cross-sectional shape of the reinforcement groove 250, the reinforcement groove 250 may have a cross-sectional shape of a circular arc. In this regard, a curvature of the circular arc shape is less than the aforementioned curvature of the attachment foot 240.

If the depth DG of the reinforcement groove 250 is less than 20% of the thickness TF of the attachment foot 240, if the length LG of the reinforcement groove 250 is less than 10% of the overall length LF of the attachment foot 240, or if the width WG of the reinforcement groove 250 is less than 20% of the maximum width WF of the attachment foot 240, it is difficult to create a work-hardened portion 245 to a required level through the indenting operation. Also, it is difficult that the anchor portion of the adhesive coating 130 is created to a required level. If the depth DG of the reinforcement groove 250 is greater than 80% of the thickness TF of the attachment foot 240, or if the width WG of the reinforcement groove 250 is greater than 80% of the maximum width WF of the attachment foot 240, it may be likely that the brittle fracture of the attachment foot 240 occurs during the indenting operation for the attachment foot 240. If the length LG of the reinforcement groove 250 is greater than 90% of the overall length LF of the attachment foot 240, a portion of the attachment foot 240, which becomes gradually thin toward the opposite end 244 of the attachment foot, cannot be smoothly formed.

Figure 9:
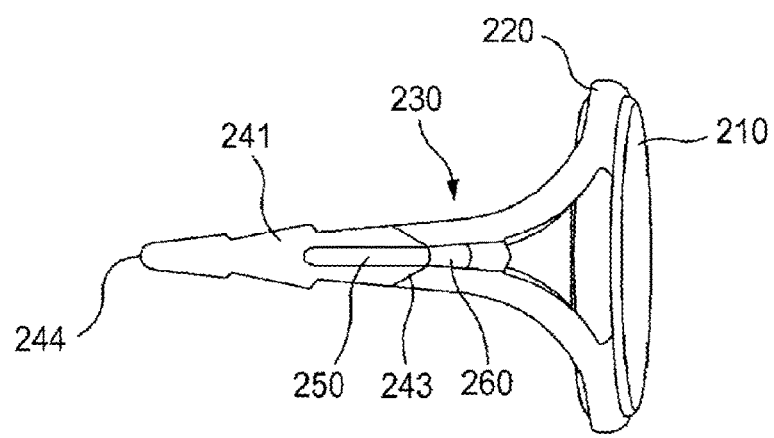
FIG. 9 is a bottom view similar to FIG. 7, showing a reinforcement groove formed in a support leg.

FIG. 9 shows an example that the above-described reinforcement groove is formed in the support leg 230. Referring to FIG. 9, the fishing line guide 200 includes a support leg reinforcement groove 260 in a surface of the support leg 230 which faces toward the tip of the fishing rod. The support leg reinforcement groove 260 extends from the open end 251 of the reinforcement groove 250, which is located in the attachment foot 240, in a longitudinal direction of the support leg 230. The support leg reinforcement groove 260 is also formed by the same method as the above-described method of forming the reinforcement groove 250. Thus, a portion of the support leg 230 in a thickness direction of the support leg, which is between the support leg reinforcement groove 260 and a surface facing the butt of the fishing rod, has a work-hardened portion. If the support leg reinforcement groove 260 is formed in the support leg 230 as described above, the work-hardened portions created by the indenting operation are formed throughout the support leg 230 and the attachment foot 240. Thus, the strength of the fishing line guide 200 can be improved more.

Figure 10:
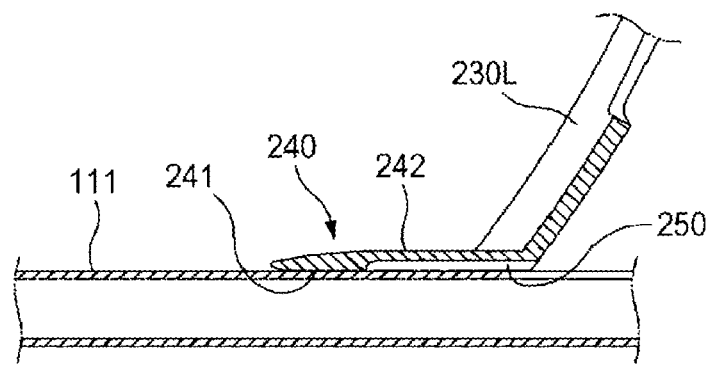
FIG. 10 is a partial sectional view showing that an attachment foot is in contact with an outer circumferential surface of a fishing rod portion.
Figure 11:
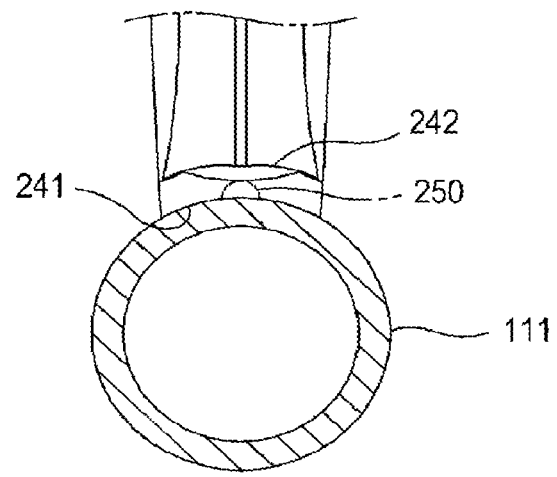
FIG. 11 is a partial front view showing that an attachment foot is in contact with an outer circumferential surface of a fishing rod portion.
Figure 12:
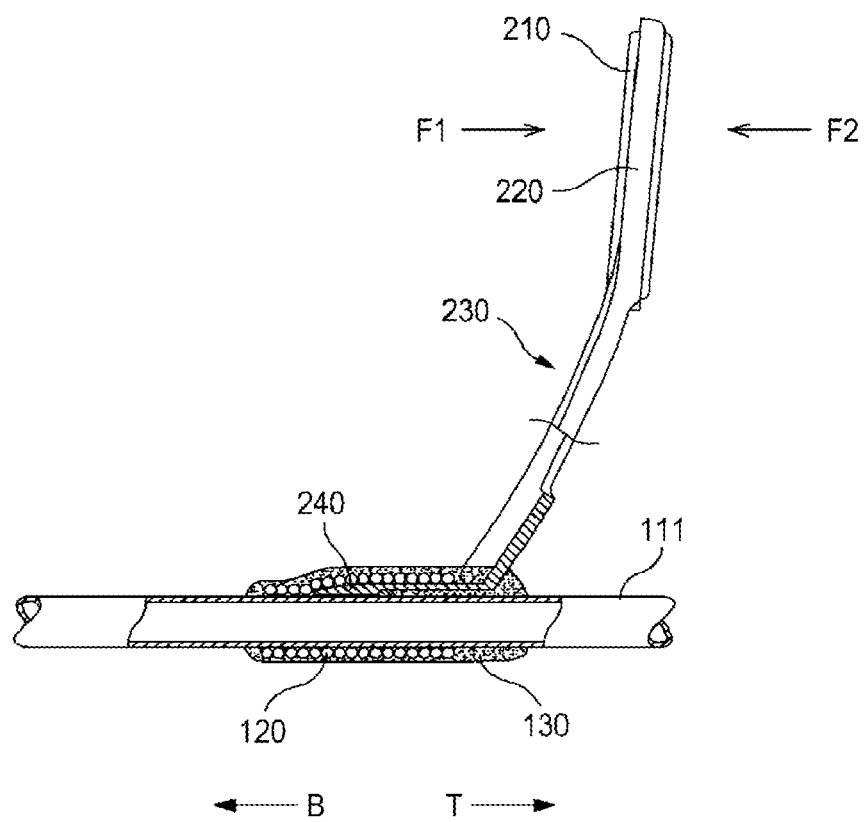
FIG. 12 is a side view showing a fishing line guide firmly fixed to a fishing rod portion, wherein an attachment foot and a portion of a support leg are shown in a sectional view.
Figure 13:
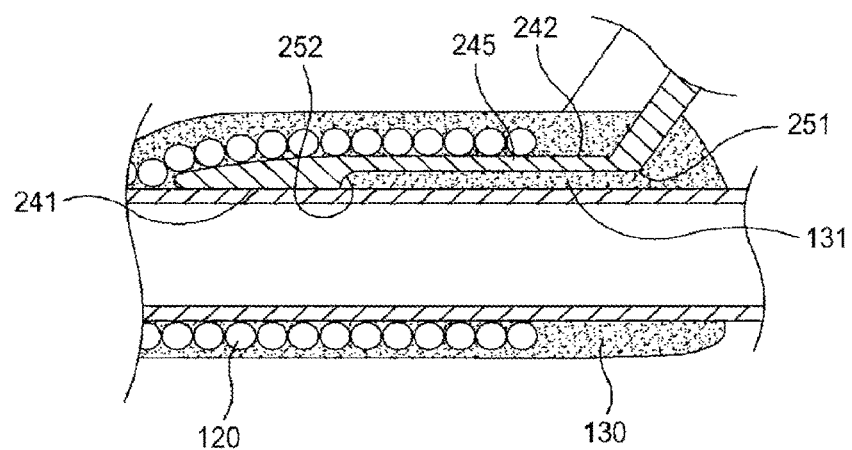
FIG. 13 is a partial enlarged view of FIG. 12.

The strength improvement of the fishing line guide 200 caused by the reinforcement groove 250 is described with reference to FIGS. 10 to 13. FIG. 10 is a longitudinal sectional view showing that the attachment foot is in contact with the outer circumferential surface of the fishing rod portion. The attachment foot 240 shown in FIGS. 10 to 13 has an overall length shorter than the attachment foot 240 shown in FIGS. 3 to 9. In FIG. 12, an arrow F1 indicates a force which is applied by the fishing line when the fishing line is pulled by a fishing rig in a state where the fishing line is entangled with the fishing line guide 200 during the casting of the fishing rig. In FIG. 12, an arrow F2 indicates a force which is applied to the fishing line guide 200 by the fishing line when the fishing rod is pulled to land a fish.

Since the reinforcement groove 250 is formed in the lower surface 241 of the attachment foot 240 through the above-described indenting operation, the attachment foot 240 has the work-hardened portion 245 created along the reinforcement groove 250. The work-hardened portion 245 is formed from the one end 243 of the attachment foot 240 along at least a portion of the reinforcement groove 250 or along the overall length of the reinforcement groove 250. Further, the work-hardened portion 245 extends from the one end 243 of the attachment foot 240 along a center in the width direction of the attachment foot 240. That is, the work-hardened portion 245 is formed at the location where loads concentrate when a force is applied to the ring retaining portion 220 or the support leg 230 in the direction of the arrow F1 or in the direction of the arrow F2. Since the work-hardened portion 245 has a yield point higher than other portions of the attachment foot 240, it is difficult to plastically deform the attachment foot 240 at a portion where the work-hardened portion 245 is created. Thus, the attachment foot 240 has an increased resistance against the load applied by the force in the direction of the arrow F1 or the arrow F2, and therefore the strength of the attachment foot 240 is reinforced due to the reinforcement groove 250.

Further, as described above, if an adhesive is applied to the winding thread 120 wound around the attachment foot 240 to firmly fix the fishing line guide 200 to the fishing rod, the adhesive flows through the open end 251 of the reinforcement groove 250 into the space between the reinforcement groove 250 and the outer circumferential surface of the fishing rod portion 111. If the adhesive which has flowed in between the reinforcement groove 250 and the fishing rod portion 111 is hardened, an anchor portion 131, which extends along the reinforcement groove 250 between the reinforcement groove 250 and the fishing rod portion 111, is created inside the adhesive coating 130 which covers the attachment foot 240. That is, the anchor portion 131, which is created by the adhesive which fills in the reinforcement groove 250 and is hardened, further reinforces the strength of the fishing line guide 200. By way of example, when a force of the arrow F1 acts on the ring retaining portion 220 or the support leg 230 from the butt of the fishing rod toward the tip of the fishing rod, the reinforcement groove 250 is caught by the anchor portion 131, preventing the attachment foot 240 from being moved out from the winding thread 120 toward the tip of the fishing rod (in the direction of the arrow T).

As described above, by forming the reinforcement groove 250 in the lower surface of the attachment foot 240 and forming the work-hardened portion 245 between the reinforcement groove 250 and the upper surface 242, the attachment foot 240 can have a strength of a desired intensity notwithstanding a thinner thickness. That is, since the work-hardened portion 245 resists the load concentrated on the attachment foot 240 and is not plastically deformed, the attachment foot 240 can have a thinner thickness and a shorter length. Further, since the anchor portion 131 of the adhesive coating 130 fixes the attachment foot 240, the attachment foot 240 can have a shorter length. Thus, the attachment foot 240 having a thinner thickness and a shorter length not only achieves the weight reduction of the fishing line guide 200, but also gives advantages to the winding operation of the winding thread 120.

Figure 14:
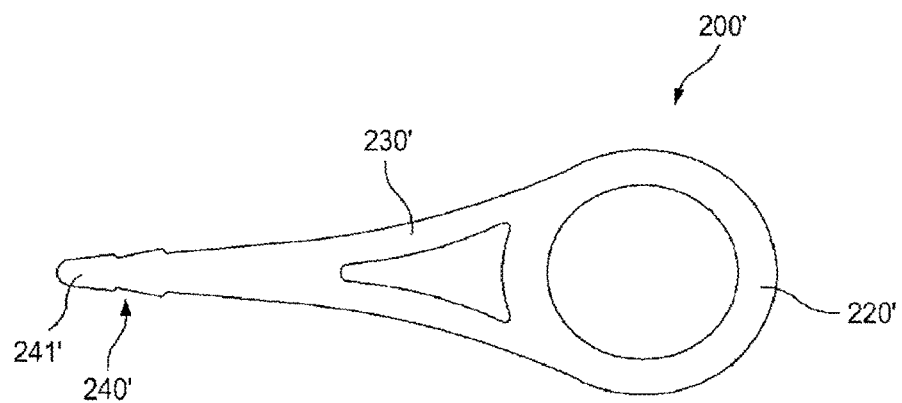
FIG. 14 schematically shows a blank sheet for manufacturing a fishing line guide according to one embodiment.

The fishing line guide 200 including the above-described reinforcement groove 250 is manufactured by a press operation on a metallic sheet made of, for example, stainless steel, titanium, titanium alloy, etc. By way of an example of manufacturing the fishing line guide 200, a metallic blank sheet 200' shown in FIG. 14 is formed by blanking the aforementioned metallic sheet. The blank sheet 200' has a shape which is formed by spreading the fishing line guide 200 to a development figure. The blank sheet 200' includes a ring retaining portion 220' which is formed into the above-described ring retaining portion 220, a support leg portion 230' which is formed in the above-described support leg 230, and an attachment foot portion 240' which is formed into the above-described attachment foot 240. The support leg 230 and the attachment foot 240 shown in FIGS. 3 to 13 are formed from the support leg portion 230' and the attachment foot portion 240' included in the blank sheet 200' through a bending operation. Next, the reinforcement groove 250 is formed in the lower surface 241 of the attachment foot 240. The reinforcement groove 250 is formed so as to extend in the longitudinal direction of the attachment foot 240 from the one end 243 of the attachment foot 240, which connects with the support leg 230, toward the opposite end 244.

In this regard, the reinforcement groove 250 is formed by indenting the lower surface 241 of the attachment foot 240 toward the upper surface 242 in the shape of the reinforcement groove 250. The indenting operation may be performed by pressing the lower surface 241 of the attachment foot 240 with an indenting tool, which has a protrusion shaped so as to correspond to the reinforcement groove 250, by means of a press machine. Further, as described above, the indenting operation is performed until a portion of the attachment foot 240 in the thickness direction between the bottom 253 of the reinforcement groove 250 and the upper surface 242 of the attachment foot 240 is work-hardened. By performing the above-described indenting and work-hardening, the attachment foot 240, which includes the reinforcement groove 250 extending from the one end 243 of the attachment foot 240 toward the opposite end 244, and the work-hardened portion 245 formed between the reinforcement groove 250 and the upper surface 242, is formed.

As another example of manufacturing the fishing line guide 200, the indenting operation may be performed before the support leg 230 and the attachment foot 240 are formed from the blank sheet 200' through a bending operation. That is, in manufacturing the fishing line guide 200, which includes at least one support leg 230 and the attachment foot 240 for attachment to the fishing rod portion 111, from the metallic blank sheet 200', the reinforcement groove 250 is formed in a lower surface 241', which makes contact with the fishing rod portion 111, of the attachment foot portion 240' included in the blank sheet 200'. In this case, the reinforcement groove 250 is formed under the above-described conditions and dimensions. Next, the support leg 230 and the attachment foot 240 shown in FIGS. 3 to 13 are formed through a bending operation from the blank sheet 200' in which the reinforcement groove 250 is formed.

Figure 15:
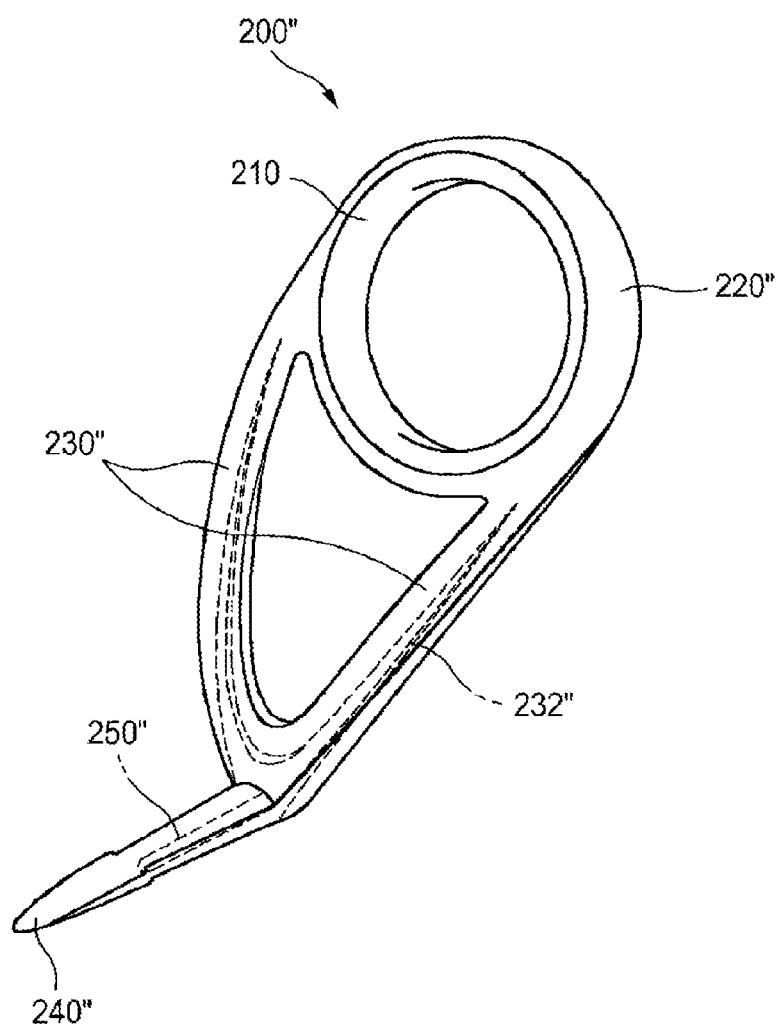
FIG. 15 is a perspective view showing an example of a fishing line guide wherein a portion of a support leg and a ring retaining portion are made of a plastic material.

In another embodiment of the fishing line guide having one attachment foot, the entire attachment foot 240 and only a portion of the support leg 230 may be integrally manufactured from the metallic blank sheet, while the rest of the support leg 230 and the ring retaining portion 220 may be manufactured from a plastic material. The fishing line guide of such an embodiment may be formed by injection molding or lamination molding the rest of the support leg and the ring retaining portion by means of a plastic material or a fiber-reinforced plastic material. FIG. 15 shows an example of a fishing line guide which has one attachment foot, and wherein the rest of the support leg and the ring retaining portion are manufactured from a plastic material. In the fishing line guide 200" shown in FIG. 15, a V-shaped metal-made support leg frame 232" is integrally formed with one end of a metal-made attachment foot 240". A reinforcement groove 250" similar to the above-described reinforcement groove 250 is formed in a lower surface of the attachment foot 240". The support leg frame 232" constitutes the aforementioned portion of the support leg. The support leg 230" of the fishing line guide 200" has the support leg frame 232" therein, and a portion of the support leg except the support leg frame 232" is formed from a plastic material. By way of example, the fishing line guide 200" may be formed by placing the support leg frame 232" in a metallic mold having a shape of the support leg 230" and the ring retaining portion 220", injecting a plastic material into the metallic mold, and molding it.

Figure 16:
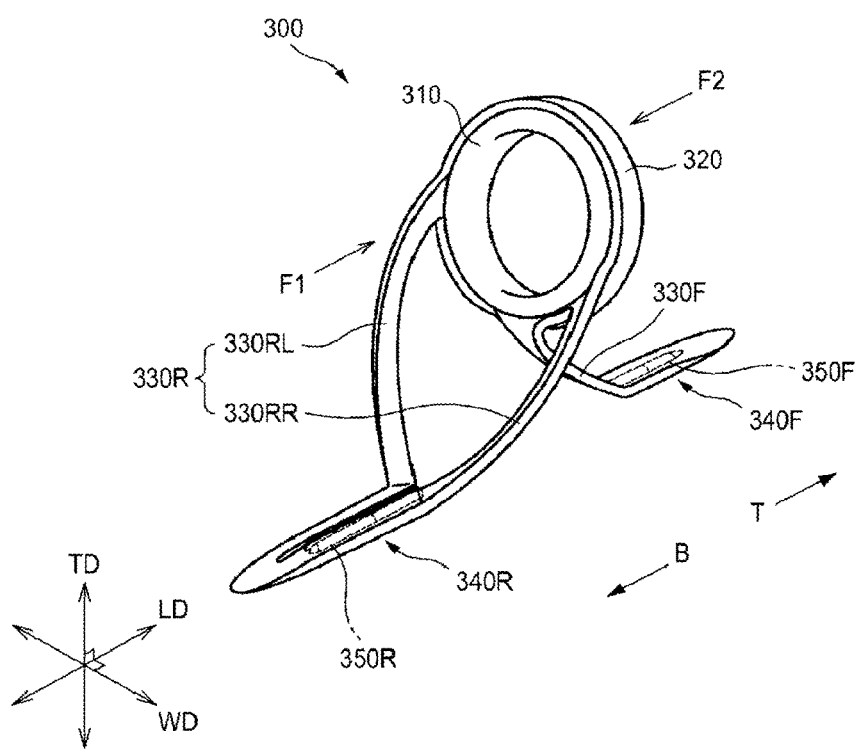
FIG. 16 is a perspective view showing a fishing line guide according to another embodiment.
Figure 17:
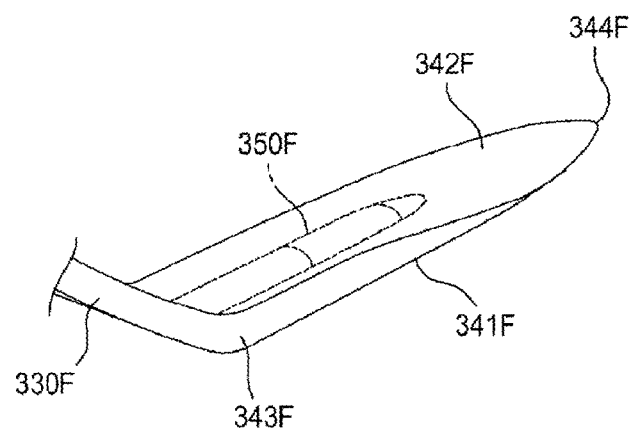
FIG. 17 is an enlarged perspective view of a front attachment foot.
Figure 18:
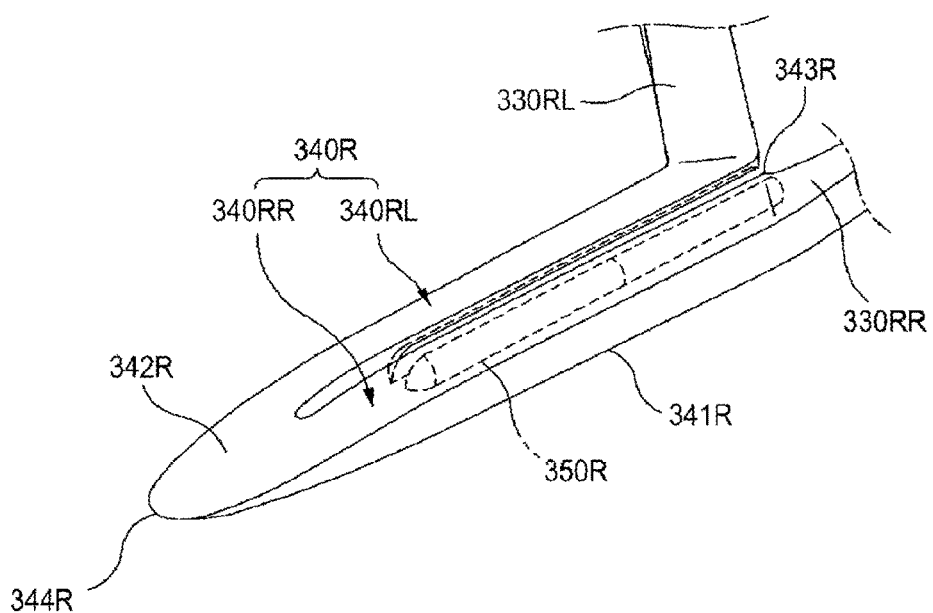
FIG. 18 is an enlarged perspective view of a rear attachment foot.
Figure 19:
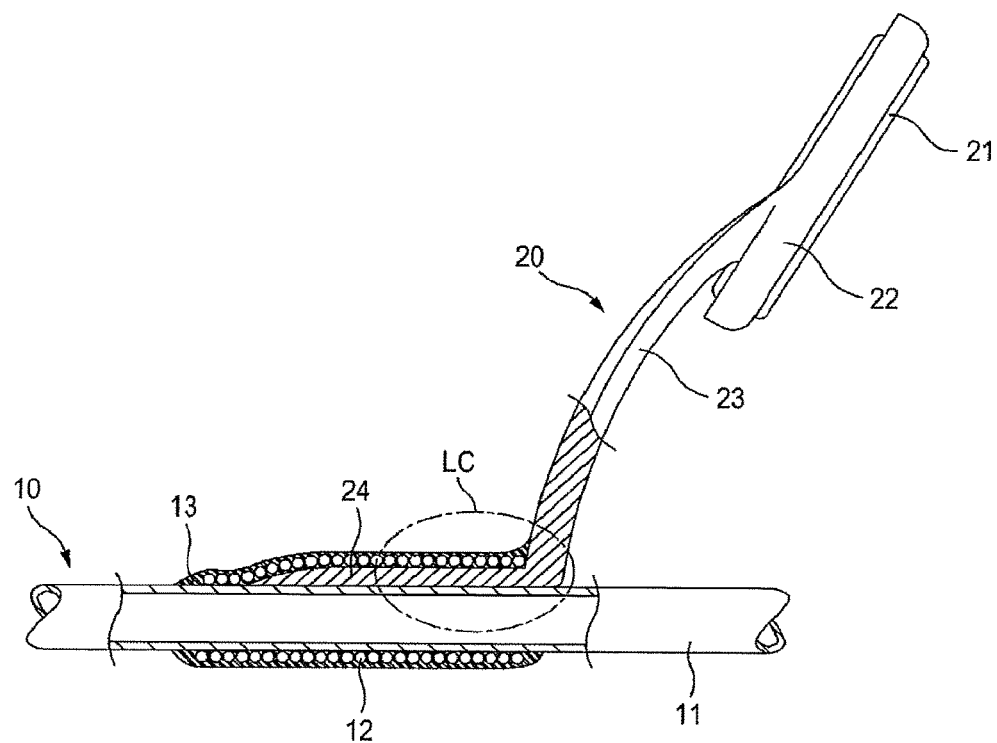
FIG. 19 is a side view showing a fishing line guide of a prior art, wherein an attachment foot and a portion of a support leg are shown in a sectional view.

FIGS. 16 to 18 show a fishing line guide 300 according to another embodiment. The fishing line guide 300 shown in FIGS. 16 to 18 has two attachment feet. Such a fishing line guide is referred to as a double-foot fishing line guide in the technical field. Referring to FIGS. 16 to 18, the fishing line guide 300 of this embodiment includes a guide ring 310 through which a fishing line passes, a ring retaining portion 320 retaining the guide ring 310, a front support leg 330F and a rear support leg 330R extending from the ring retaining portion 320, a front attachment foot 340F located at a distal end of the front support leg 330F, and a rear attachment foot 340R located at a distal end of the rear attachment foot 340R. Each part of the fishing line guide 300 except the guide ring 310 is formed from a metallic sheet.

The guide ring 310 through which a fishing line passes is formed similarly to the above-described guide ring 210. The guide ring 310 is fitted to an inner peripheral surface of the ring-shaped ring retaining portion 320 at an outer circumferential surface of the guide ring.

The front support leg 330F extends from a lower end of the ring retaining portion 320 toward the tip of the fishing rod (in a direction of an arrow T shown in FIG. 16). The rear support leg 330R extends from a lateral edge of the ring retaining portion 320 toward the butt of the fishing rod (in a direction of an arrow B shown in FIG. 16). In this embodiment, the rear support leg 330R comprises a pair of rear support legs 330RL and 330RR. When the fishing line guide 300 is viewed from the front (when the fishing rod 100 is viewed from the butt toward the tip in the state where the fishing line guide 300 is mounted on the fishing rod 100), the rear support leg 330RL in the left-hand side extends from a left edge of the ring retaining portion 320, and the rear support leg 330RR in the right-hand side extends from a right edge of the ring retaining portion 320. When the fishing line guide 300 is viewed from the front, each rear support leg 330RL, 330RR is acutely bent in a circular arc shape and approaches each other at a lower end thereof.

The fishing line guide 300 includes both the front attachment foot 340F and the rear attachment foot 340R for attachment to the fishing rod portion 111. The front attachment foot 340F and the rear attachment foot 340R have a thin and flat shape. Each of the front support leg 340F and the rear support leg 340R has a lower surface 341F, 341R which makes contact with the outer circumferential surface of the fishing rod portion 111, and an upper surface 342F, 342R which is located opposite the lower surface 341F, 341R in a thickness direction. In this embodiment, the lower surface 341F, 341R has a flat surface or a curved surface which is concave upward with a little curvature. Further, each of the front attachment foot 340F and the rear attachment foot 340R has one end 343F, 343R, and an opposite end 344F, 344R located opposite the one end 343F, 343R in a longitudinal direction. The front attachment foot 340F is integrally formed with a distal end of the front support leg 330F at the one end 343F, and extends at an obtuse angle from the distal end of the front support leg 330F. The front attachment foot 340F and the front support leg 330F are bent at an obtuse angle with respect to each other. The rear attachment foot 340R is integrally formed with a distal end of each rear support leg 330RL, 330RR at the one end 343R, and extends at an obtuse angle from the distal ends of the rear support legs 330RL and 330RR. The rear attachment foot 340R and the rear support leg 330RL, 330RR are bent at an obtuse angle with respect to each other. The rear attachment foot 340R has a left half 340RL extending from the distal end of the left rear support leg 330RL, and a right half 340RR extending from the distal end of the right rear support leg 330RR. The halves 340RL and 340RR of the rear attachment foot 340R adjoin each other and are integrally formed at the respective opposite ends. Thus, when the fishing line guide 300 is viewed from the top, the rear attachment foot 340R has an approximately U-like shape. By way of another example, the rear attachment foot 340R may include a single part which extends from the distal ends of the rear support legs 330RL and 330RR.

The front reinforcement groove 350F is formed in the lower surface 341F of the front attachment foot 340F and reinforces the strength of the front attachment foot 340F. The front reinforcement groove 350F is centrally located in the lower surface 341F of the front attachment foot 340F in a width direction of the front attachment foot 340F (in a direction of an arrow WD shown in FIG. 16). The front reinforcement groove 350F extends along a longitudinal direction of the front attachment foot 340F (in a direction of an arrow LD shown in FIG. 16) from the one end 343F of the front attachment foot 340F, which adjoins the distal end of the front support leg 330F, toward the opposite end 344F. The rear reinforcement groove 350R is formed in the lower surface 341R of the rear attachment foot 340R and reinforces the strength of the rear attachment foot 340R. The rear reinforcement groove 350R is centrally located in the lower surface 341R of the rear attachment foot 340R in a width direction of the rear attachment foot 340R (e.g., at the opposing portions of the half 340RL and the half 340RR). The rear reinforcement groove 350R extends along a longitudinal direction of the rear attachment foot 340R from the one end 343R of the rear attachment foot 340R, which adjoins the distal end of the rear support leg 330R (the distal ends of the left rear support leg 330RL and the right rear support leg 330RR), toward the opposite end 344R. The front reinforcement groove 350F and the rear reinforcement groove 350R are formed by the same manner as the reinforcement groove 250 of the above-described embodiment, and has the same dimensional conditions as those of the reinforcement groove 250 of the above-described embodiment.

In FIG. 16, an arrow F1 and an arrow F2 show a force which is applied to the fishing line guide when the fishing line is entangled toward the center of the fishing line guide in the case where the fishing line is entangled with the fishing line guide and the fishing line is pulled by the fishing rig during casting the fishing rig. Further, the arrow F2 shows a force which is applied to the fishing line guide by the fishing line when the fishing rod is pulled to land a fish. Due to the aforementioned forces, loads are heavily concentrated to the vicinity of the one end of the front attachment foot 340F or the rear attachment foot 340R. The fishing line guide 300 of this embodiment has the front reinforcement groove 350F and the rear reinforcement groove 350R at the front attachment foot 340F and the rear attachment foot 340R respectively. A work-hardened portion is created in the vicinity of the one end of the front attachment foot 340F through the front reinforcement groove 350F, and a work-hardened portion is created in the vicinity of the one end of the rear attachment foot 340R through the rear reinforcement groove 350R. Due to such work-hardened portions, it is difficult to plastically deform the front attachment foot 340F and the rear attachment foot 340R due to said loads, thus increasing the strength of the fishing line guide 300. Further, as described with regard to the foregoing embodiment, if an adhesive is applied on the winding thread wound around the attachment foot to firmly fix the fishing line guide 300 to the fishing rod portion 111, the adhesive flows into the front reinforcement groove 350F and the rear reinforcement groove 350R and is hardened therein. Thus, the anchor portion is created in the adhesive coating 130 between the front reinforcement groove 350F and the fishing rod portion 111 or between the rear reinforcement groove 350R and the fishing rod portion 111. As such, the anchor portion created by the adhesive, which fills in the front reinforcement groove 350F and the rear reinforcement groove 350R and is hardened, further reinforces the strength of the fishing line guide 300.

The fishing line guide 300 including the front reinforcement groove 350F and the rear reinforcement groove 350R is manufactured by the method similar to the fishing line guide 200 of the above-described embodiment. As one example of manufacturing the fishing line guide 300, the fishing line guide 300 is formed by press operation on a metallic sheet made of, for example, stainless steel, titanium, titanium alloy, etc. A metallic blank sheet, which has a shape formed by spreading the fishing line guide 300 to a development FIG. 14, is formed by blanking the aforementioned metallic sheet. Next, the front support leg 330F and the front attachment foot 340F shown in FIGS. 16 and 17 are formed from the aforementioned blank sheet by a bending operation. Further, the rear support leg 330R and the rear attachment foot 340R shown in FIGS. 16 and 18 are formed from the aforementioned blank sheet by a bending operation. Next, the front reinforcement groove 350F is formed in the lower surface 341F of the front attachment foot 340F, and the rear reinforcement groove 350R is formed in the lower surface 341R of the rear attachment foot 340R. The front reinforcement groove 350F is formed by indenting the lower surface 341F of the front attachment foot 340F with an indenting tool, which has a protrusion shaped so as to correspond to the front reinforcement groove 350F, by means of a press machine. Further, the indenting operation is performed until a portion of the front attachment foot 340F in a thickness direction between the front reinforcement groove 350F and the upper surface 342F of the front attachment foot 340F is work-hardened. The rear reinforcement groove 350R is formed by the same method as the front reinforcement groove 350F.

According to another example of manufacturing the fishing line guide 300, the indenting operation is performed before the front support leg 330F, the front attachment foot 340F, the rear support leg 330R and the rear attachment foot 340R are formed from the aforementioned blank sheet through a bending operation. That is, a portion for forming the front attachment foot 340F and a portion for forming the rear attachment foot 340R, which are included in the aforementioned blank sheet, are formed with the front reinforcement groove 350F and the rear reinforcement groove 350R respectively. Next, the front support leg 330F, the front attachment foot 340F, the rear support leg 330R and the rear attachment foot 340R are formed from the blank sheet wherein the front reinforcement groove 350F and the rear reinforcement groove 350R are formed.

In other embodiments of the fishing line guide having two attachment feet, the entire front attachment foot 340F and only a portion of the front support leg 330F may be integrally manufactured from the metallic blank sheet, and the entire rear attachment foot 340R and only a portion of the rear attachment foot 340R may be integrally manufactured from the metallic blank sheet. The rest of the front support leg 330F, the rest of the rear support leg 330R and the ring retaining portion 320 may be manufactured from a plastic material. The fishing line guide of such an embodiment may be formed by injection molding or lamination molding the rest of the front support leg, the rest of the rear support leg and the ring retaining portion by means of a plastic material or a fiber-reinforced plastic material.

The present disclosure described heretofore should not be limited to the above-described embodiments and the accompanying drawings. It will be apparent to those of ordinary skill in the technical field to which the present disclosure pertains, that various substitutions, modifications and alternations may be made without departing from the technical idea of the present disclosure.

DESCRIPTION OF REFERENCE SYMBOLS 100 fishing rod, 111 fishing rod portion, 120 winding thread, 130 adhesive coating, 131 anchor portion, 200, 200" fishing line guide, 210 guide ring, 220, 220" ring retaining portion, 230, 230" support leg, 231 opening, 240, 240" attachment foot, 241 lower surface, 242 upper surface, 243 one end, 244 opposite end, 245 work-hardened portion, 250 reinforcement groove, 251 open end, 252 closed end, 253 bottom, 260 support leg reinforcement groove, 200' blank sheet, 220' ring retaining portion, 230' support leg portion, 240' attachment foot portion, 300 fishing line guide, 310 guide ring, 320 ring retaining portion, 330F front support leg, 330R rear support leg, 330RL left rear support leg, 330RR right rear support leg, 340F front attachment foot, 340R rear attachment foot, 340RL left half of rear attachment foot, 340RR right half of rear attachment foot, 341F, 341R lower surface, 342F, 342R upper surface, 343F, 343R one end, 344F, 344R opposite end, 350F front reinforcement groove, 350R rear reinforcement groove, T direction directed to tip of fishing rod, B direction directed to butt of fishing rod, LD longitudinal direction of attachment foot, WD width direction of attachment foot, TD thickness direction of attachment foot, LF overall length of attachment foot, WF maximum width of attachment foot, TF maximum thickness of attachment foot, LG overall length of reinforcement groove, WG width of reinforcement groove, DG depth of reinforcement groove

What is claimed is:
1. A fishing line guide, comprising:
   a ring retaining portion retaining a guide ring through which a fishing line passes;
   at least one support leg extending from the ring retaining portion;
   an attachment foot located at a distal end of the support leg, the attachment foot having a lower surface configured to contact a portion of a fishing rod, an upper surface located opposite the lower surface in a thickness direction, one end of the attachment foot connected to the distal end of the support leg, and an opposite end of the attachment foot located opposite the one end in a longitudinal direction; and
   a reinforcement groove formed in the lower surface of the attachment foot and being concave from the lower surface of the attachment foot, the reinforcement groove extending along the longitudinal direction of the attachment foot from the one end toward the opposite end, wherein the reinforcement groove has an open end located at the one end of the attachment foot, and a closed end located opposite the open end and spaced apart from the opposite end of the attachment foot toward the one end of the attachment foot, wherein the reinforcement groove makes a space, between the reinforcement groove and an outer circumferential surface of the portion of the fishing rod, wherein a portion of the support leg and the attachment foot are made of a metallic material, wherein the upper surface of the attachment foot is level in the thickness direction along the entire reinforcement groove, and wherein a junction between the at least one support leg and the attachment foot extends from the open end of the reinforcement groove and is shorter than the reinforcement groove.

2. The fishing line guide of claim 1, wherein a portion of the attachment foot in the thickness direction between the reinforcement groove and the upper surface of the attachment foot comprises a work-hardened portion.

3. The fishing line guide of claim 2, wherein the reinforcement groove is formed by indenting the lower surface of the attachment foot toward the upper surface of the attachment foot.

4. The fishing line guide of claim 2, wherein the work-hardened portion has the highest yield point in the attachment foot.

5. The fishing line guide of claim 2, wherein the reinforcement groove and the work-hardened portion are located in a region of the lower surface where the lower surface configured to contact a portion of the fishing rod.

6. The fishing line guide of claim 1, wherein a depth of the reinforcement groove is 20% to 80% of a thickness between the lower surface and the upper surface of the attachment foot.

7. The fishing line guide of claim 1, wherein a length of the reinforcement groove is 10% to 90% of a length between the one end and the opposite end.

8. The fishing line guide of claim 1, wherein a width of the reinforcement groove is 20% to 80% of a maximum width of the attachment foot.

9. The fishing line guide of claim 1, further comprising a support leg reinforcement groove which is formed in a surface of the support leg and extends from the reinforcement groove.

10. A fishing rod including the fishing line guide of claim 1.

11. A method of manufacturing a fishing line guide from a metallic blank sheet, the fishing line guide including at least one support leg and an attachment foot, the method comprising:

indenting a lower surface of the attachment foot toward an upper surface of the attachment foot to form a reinforcement groove, the upper surface located opposite the lower surface in a thickness direction of the attachment foot, the lower surface of the attachment foot configured to contact a portion of a fishing rod, the reinforcement groove extending in a longitudinal direction of the attachment foot from one end of the attachment foot toward an opposite end oppositely located in the longitudinal direction of the attachment foot, the upper surface of the attachment foot being level in the thickness direction along the reinforcement groove, and forming the support leg which is connected to the one end of the attachment foot at a distal end and is bent with respect to the attachment foot, wherein the reinforcement groove is concave from the lower surface of the attachment foot and has an open end located at the one end of the attachment foot and a closed end located opposite the open end and spaced apart from the opposite end of the attachment foot toward the one end of the attachment foot, wherein the reinforcement groove makes a space into which an adhesive to fix the fishing line guide flows, and wherein a junction between the at least one support leg and the attachment foot extends from the open end of the reinforcement groove and is shorter than the reinforcement groove.

12. A fishing rod including a fishing line guide manufactured by the method of manufacturing a fishing line guide of claim 11.

13. The method of claim 11, wherein indenting the lower surface of the attachment foot includes forming a work-hardened portion along the reinforcement groove, and the work-hardened portion has the highest yield point in the attachment foot.

14. A method of manufacturing a fishing line guide, comprising:

forming at least one support leg and an attachment foot, which is connected to a distal end of the support leg at one end and is bent with respect to the support leg, by pressing a metallic sheet; and indenting a lower surface of the attachment foot toward an upper surface located opposite the lower surface in a thickness direction to form a reinforcement groove, the lower surface of the attachment foot configured to contact a portion of a fishing rod, the reinforcement groove extending in a longitudinal direction of the attachment foot from the one end of the attachment foot toward an opposite end oppositely located in the longitudinal direction of the attachment foot, the upper surface of the attachment foot being level in the thickness direction along the reinforcement groove, wherein the reinforcement groove is concave from the lower surface of the attachment foot and has an open end located at the one end of the attachment foot and a closed end located opposite the open end and spaced apart from the opposite end of the attachment foot toward the one end of the attachment foot, wherein the reinforcement groove makes a space into which an adhesive for fixing the fishing line guide flows, and wherein a junction between the at least one support leg and the attachment foot extends from the open end of the reinforcement groove and is shorter than the reinforcement groove.

15. A fishing rod including a fishing line guide manufactured by the method of manufacturing a fishing line guide of claim 14.

16. The method of claim 14, wherein indenting the lower surface of the attachment foot includes forming a work-hardened portion along the reinforcement groove, and the work-hardened portion has the highest yield point in the attachment foot.

* * * * *